(12) United States Patent
Tang (10) Patent No.: US 7,684,128 B2
(45) Date of Patent: Mar. 23, 2010

(54) OPTICAL LENS SYSTEM FOR TAKING IMAGE

(75) Inventor: Hsiang-Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/207,192

(22) Filed: Sep. 9, 2008

(65) Prior Publication Data

US 2009/0213475 A1    Aug. 27, 2009

(30) Foreign Application Priority Data

Feb. 27, 2008    (TW) .............................. 97106915 A (51) Int. Cl.
*G02B 9/12* (2006.01)
(52) U.S. Cl. .................. 359/784; 359/715; 359/716
(58) Field of Classification Search .............. 359/708, 359/789, 784, 713–716
See application file for complete search history.

(56) References Cited

U.S. PATENT DOCUMENTS 7,450,323 B2 *  11/2008  Nakamura .................. 359/784
2005/0275950 A1 *  12/2005  Kubota et al. ............... 359/689

* cited by examiner

*Primary Examiner*—Joseph Martinez
*Assistant Examiner*—James R Greece
(74) *Attorney, Agent, or Firm*—Banger Shia (57) ABSTRACT

An optical lens system for taking image consisting of three lens elements with refractive power, in order from the object side to the image side: a meniscus first lens element with positive refractive power having a convex object-side surface; an aperture stop; a meniscus plastic second lens element with negative refractive power having a convex image-side surface, and the object-side surface and the image-side surface of the second lens element being both aspheric, the Abbe number of the second lens element being V2, and it satisfying the relation: V2>40; a meniscus plastic third lens element with negative refractive power having a convex object-side surface, the object-side surface and the image-side surface of the third lens element being both aspheric, an Abbe number of the third lens element being V3, and it satisfying the relation: V3>40.

17 Claims, 4 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a digital camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera described usually consists of three lens elements: from the object side to the image side: a first lens element with positive refractive power, a second lens element with negative refractive power and a third lens element with positive refractive power, such as the optical lens system for taking image described in U.S. Pat. No. 7,262,965.

However, the third lens element of the above patent is positive in such a manner that the principal point is close to the image side of the system, so the back focal length is relatively long, which results in a relatively large mechanical structure. As a result, the requirement of miniaturization can not be satisfied.

An optical lens system for taking image which uses lens elements made of glass and plastic is described in U.S. Pat. No. 6,490,102, wherein the third lens element is a spherical glass lens element. The use of the spherical lens element reduces the degrees of freedom available for correcting the off-axis aberration of the optical lens system, making it more difficult to control image quality.

The present invention mitigates and/or obviates the aforementioned disadvantages.

SUMMARY OF THE INVENTION

The primary objective of the present invention is to improve image quality, and effectively reduce the volume of the optical lens system while considering the ease of manufacture of the lens elements. The present invention provides a whole new three-lens type optical lens system.

An optical lens system for taking image in accordance with the present invention consists of, in order from the object side to the image side: a meniscus first lens element with positive refractive power having a convex object-side surface; an aperture stop; a meniscus second lens element with negative refractive power having a convex image-side surface, the object-side surface and the image-side surface of the second lens element being both aspheric; a meniscus third lens element with negative refractive power having a convex object-side surface, the object-side surface and the image-side surface of the third lens element being both aspheric.

In the present optical lens system for taking image, the refractive power of the system is mainly provided by the first lens element with positive refractive power. The second lens element with negative refractive power and the third lens element with negative refractive power both serve as correcting lens elements to balance and correct various aberration caused by the optical lens system.

The first lens element provides a strong positive refractive power, and the aperture stop is located close to the object side, so that the total track length of the optical lens system will be effectively reduced and the exit pupil of the optical lens system will also be far away from the image plane. Therefore, the light will be projected onto the sensor with a relatively small incident angle, and this is the telecentric feature of the image side. Further, at least one inflection point is formed on the third lens element to contribute to a better correction of the incident angle of the off axis light with respect to the sensor. The telecentric feature is very important to the photosensitive power of the current solid-state sensor, and can improve the photosensitivity of the sensor while reducing the probability of the occurrence of shading.

In addition, in a wide angle optical system, it is especially necessary to correct the distortion and the chromatic aberration of magnification, and this can be solved by locating the aperture stop at the balance point of the refractive power of the system. However, in the present optical lens system for taking image, the aperture stop is located between the first lens element aid the second lens element in order to balance the telecentric and the wide angle features while effectively reducing the sensitivity of the optical lens system.

With the trend of miniaturization of the optical lens system and the requirement of increasing the field of view, the focal length of the optical lens system is becoming very short. Therefore, the radius of curvature and the size of the lens elements must be very small, and it is impossible to make such glass lens elements by the use of conventional grinding. Plastic material is introduced to make lens elements by injection molding, using a relatively low cost to produce high precision lens elements. The surface of lens element is aspheric, allowing more design parameters (than spherical surfaces), so as to better correct aberration and reduce the number of the lens elements required.

In the present optical lens system for taking image, the Abbe number of the second lens element is V2, the Abbe number of the third lens element is V3, and they satisfy the relations:

$$V2>40;$$

$$V3>40.$$

The above relation can effectively correct the coma aberration caused by the system.

In the present optical lens system for taking image, the Abbe number of the first lens element is V1, the Abbe number of the second lens element is V2, the Abbe number of the third lens element is V3, and they satisfy the relations:

$$V1-V3<10;$$

$$(V1+V3)/2-V2<8.$$

The above relation can effectively correct the coma aberration caused by the system, and it can be satisfied by selecting the suitable material for the lens elements.

In the present optical lens system for taking image, the focal length of the optical lens system for taking image is f, the focal length of the first lens element is f1, and they satisfy the relation:

$$0.9<f/f1<1.5.$$

If the value of f/f1 is smaller than the above lower limit, the refractive power of the system will be weak, the total track length of the system will be too long, and it will be difficult to suppress the incident angle of the light with respect to the sensor. And if the value of f/f1 is greater than the above upper limit, the high order aberration of the system will be too larger. Further, it will be better if f/f1 satisfies the relation:

$1.05 < f/f1 < 1.35.$

Further, the focal length of the optical lens system for taking image is f, the focal length of the first lens element is f1, and it will be the best if f/f1 satisfies the relation:

$1.1 < f/f1 < 1.25.$

In the present optical lens system for taking image, the focal length of the optical lens system for taking image is f, the focal length of the second lens element is f2, the focal length of the third lens element is f3, and they satisfy the relations:

$-0.5 < f/f2 < 0.$ $-0.5 < f/f3 < 0.$

If f/f2 and f/f3 satisfy the above relation, the second lens element and the third lens element serve as correcting lens elements. Further, it will be better if f, f2, f3 satisfy the relation:

$-0.15 < f/f2 < -0.03;$ $-0.15 < f/f3 < -0.03.$

In the present optical lens system for taking image, the radius of curvature of the object-side surface of the first lens element is R1, the radius of curvature of the image-side surface of the first lens element is R2, and they satisfy the relation:

$1/R2 < 0.15 \text{ mm}^{-1};$ $R1/R2 < 0.25.$

If the values of 1/R1, R1/R2 are greater than the above upper limits, it will be difficult to correct the spherical aberration caused by the system. Further, it will be better if R1, R2 satisfy the relations:

$1/R1 < 0.11 \text{ mm}^{-1};$ $R1/R2 < 0.19.$

In the present optical lens system for taking image, the radius of curvature of the object-side surface of the second lens element is R3, the radius of curvature of the image-side surface of the second lens element is R4, and they satisfy the relation:

$0.6 < R3/R4 < 0.9.$

If the value of R3/R4 is smaller than the above lower limit, the total track length of the optical lens system for taking image will be too greater. If the value of R3/R4 is greater than the above upper limit, it will be difficult to correct the chromatic aberration caused by the system.

In the present optical lens system for taking image, the radius of curvature of the object-side surface of the third lens element is R5, the radius of curvature of the image-side surface of the third lens element is R6, and they satisfy the relation:

$1.1 < R5/R6 < 1.5;$

The third lens element can serve as a correcting lens element if R5/R6 satisfies the above relation.

In the present optical lens system for taking image, if the Abbe number V2 of the second lens element satisfies the relation: V2<28, it will be favorable to correct the chromatic aberration caused by the system.

In the present optical lens system for taking image, the refractive index of the first lens element is N1, the refractive index of the second lens element is N2, the refractive index of the third lens element is N3, and they satisfy the relations:

$1.50 < N1 < 1.60;$ $1.50 < N2 < 1.56;$ $1.50 < N2 < 1.56;$

If N1, N2 and N3 satisfy the above relations, it will be likely to find an appropriate plastic optical material to match the optical lens system and will be favorable to correct the coma aberration caused by the system. Further, if the first lens element, the second lens element and the third lens element are made of the same plastic material, it will be favorable to manage production and reduce the production cost.

In the present optical lens system for taking image, the tangential angle of the image-side surface of the third lens element at the position of its effective optical diameter is ANG32, and it satisfies the relation:

$ANG32 < -17 \text{ deg}.$

The above relation can effectively reduce the incident angle of the off axis light with respect to the sensor, and allow better correction of the off-axis aberration of the system.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise.

In the present optical lens system for taking image, the optical lens system for taking image further consists of an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH < 2.15.$

The above relation can maintain the objective of miniaturization of the optical lens system for taking image.

The present invention will become more obvious from the following description when taken in connection with the accompanying drawings, which show, for purpose of illustration only, the preferred embodiments in accordance with the present invention.

DETAILED DESCRIPTION OF THE PREFERRED EMBODIMENTS

Figure 1:
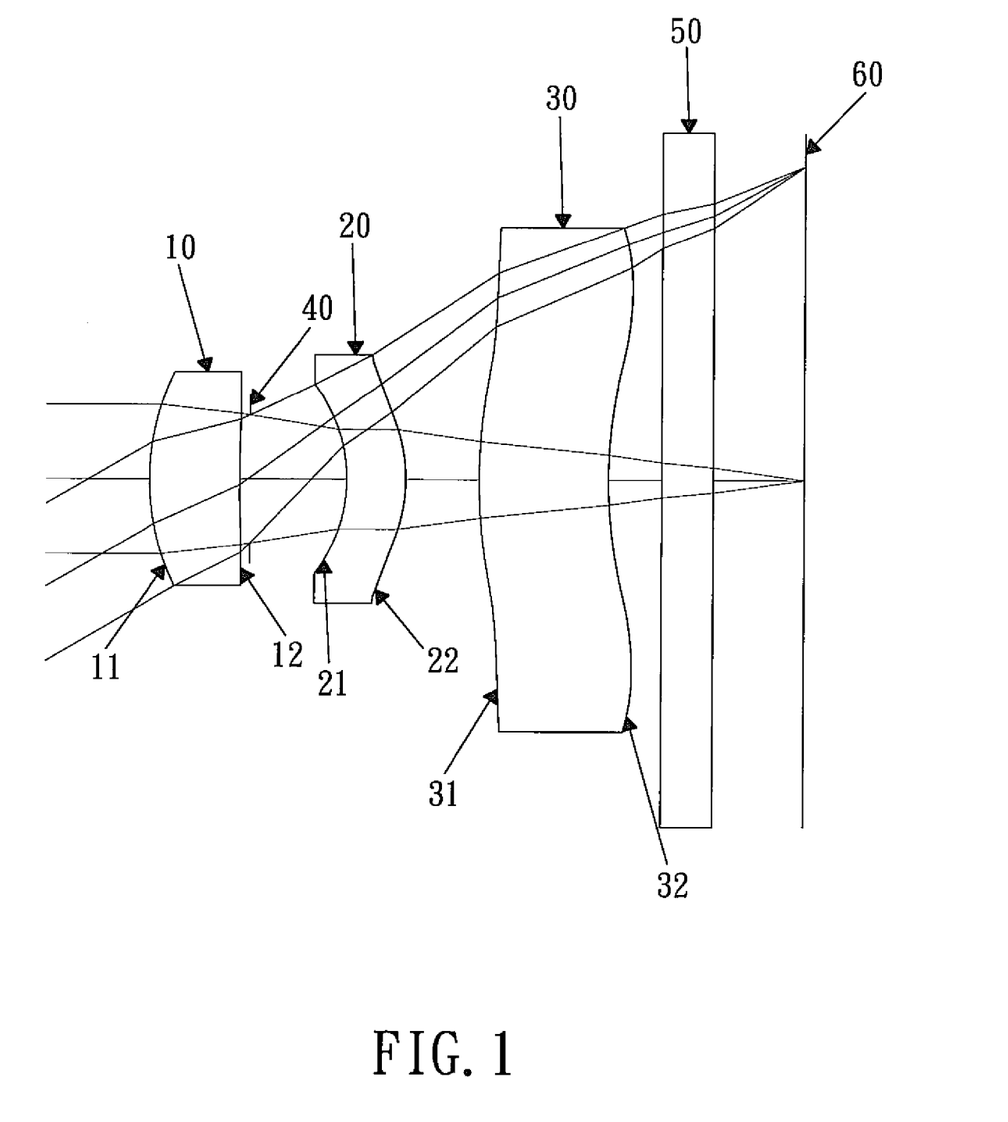
FIG. 1 shows an optical lens system for taking image in accordance with a first embodiment of the present invention.
Figure 2:
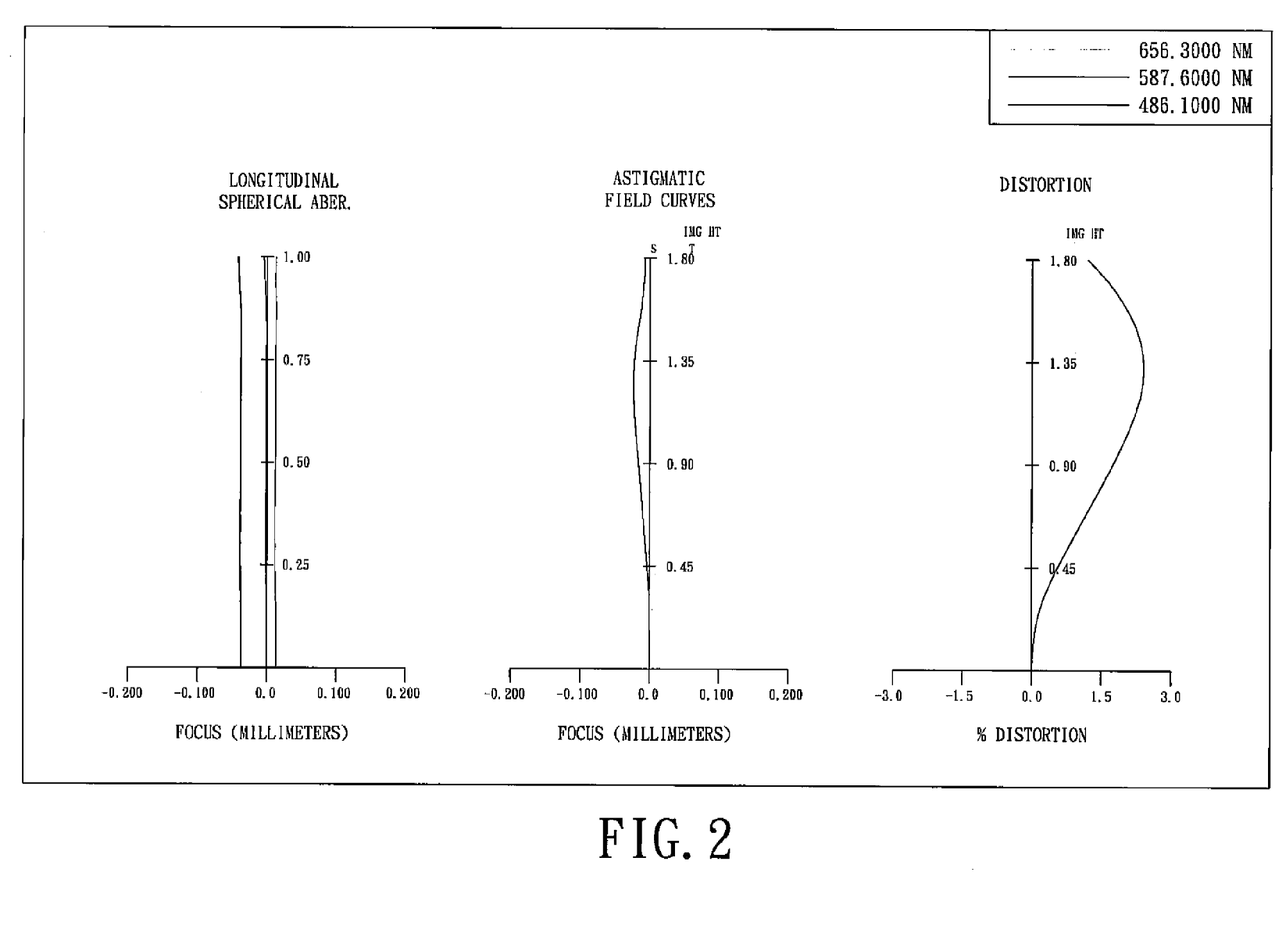
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. An optical lens system for taking image in accordance with the first embodiment of the present invention consists of three lens elements with refraction power: in order from the object side to the image side:

A meniscus plastic first lens element 10 with positive refractive power has a convex object-side surface 11, and the object-side surface 11 and the image-side surface 12 of the first lens element 10 are both aspheric.

A meniscus plastic second lens element 20 with negative refractive power has a convex image-side surface 22, and the object-side surface 21 and the image-side surface 22 of the second lens element 20 are both aspheric.

A meniscus plastic third lens element 30 with negative refractive power has a convex object-side surface 31, the object-side surface 31 and the image-side surface 32 of the third lens element 30 are both aspheric, and inflection points are formed on the object-side surface 31 and the image-side surface 32 of the third lens element 30.

An aperture stop 40 is located between the first lens element 10 and the second lens element 20.

An IR filter 50 is located behind the third lens element 30 and has no influence on the focal length of the system.

An image plane 60 is located behind the IR filter 50.

The equation for the aspheric surface profiles of the first embodiment is expressed as follows:

$$X(Y) = (Y^2/R)/(1 + sqrt(1-(1+k)*(Y/R)^2)) + \sum_i (Ai)*(Y^i)$$

wherein:

X: the height of a point on the aspheric lens surface at a distance Y from the optical axis, relative to the tangential plane at the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the second lens element is f2, the focal length of the third lens element is f3, and they satisfy the relations:

f=3.11 mm;

f/f1=1.12;

f/f2=−0.12;

f/f3=−0.05.

In the first embodiment of the present optical lens system for taking image, the refractive index of the first lens element is N1, and it satisfies the relation: N1=1.543.

In the first embodiment of the present optical lens system for taking image, the refractive index of the second lens element is N2 and it satisfies the relation: N2=1.543.

In the first embodiment of the present optical lens system for taking image, the refractive index of the third lens element is N3 and it satisfies the relation: N1=1.543.

In the first embodiment of the present optical lens system for taking image, the Abbe number of the first lens element is V1, the Abbe number of the second lens element is V2, the Abbe number of the third lens element is V3, and they satisfy the relations:

V2=56.5;

V3=56.5;

V1−V3=0.0;

(V1+V3)/2−V2=0.0.

In the first embodiment of the present optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and they satisfy the relations:

1/R2=0.13 mm$^{-1}$;

R1/R2=0.17;

R3/R4=0.82;

R5/R6=1.20.

In the first embodiment of the present optical lens system for taking image, the tangential angle of the image-side surface of the third lens element at the position of its effective optical diameter is ANG32, and it satisfies the relation:

ANG32=−19.2 deg.

In the first embodiment of the present optical lens system for taking image, the total track length of the optical lens system for taking image is TTL, the maximum image height of the optical lens system for taking image is ImgH, and they satisfy the relation:

TTL/ImgH=2.08.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 3.11 mm, Fno = 3.6, HFOV (half of field of view) = 29.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.28830 (ASP) | 0.529 | Plastic | 1.543 | 56.5 | 2.78 |
| 2 | | 7.47260 (ASP) | 0.039 | | | | |
| 3 | Ape. Stop | Plano | 0.517 | | | | |
| 4 | Lens 2 | −0.84000 (ASP) | 0.350 | Plastic | 1.543 | 56.5 | −25.82 |
| 5 | | −1.02458 (ASP) | 0.409 | | | | |
| 6 | Lens 3 | 2.31374 (ASP) | 0.722 | Plastic | 1.543 | 56.5 | −59.16 |
| 7 | | 1.92126 (ASP) | 0.300 | | | | |
| 8 | IR-filter | Plano | 0.300 | Glass | 1.517 | 64.1 | |
| 9 | | Plano | 0.532 | | | | |
| 10 | Image | Plano | | | | | |

TABLE 2

Aspheric Coefficients

| | \multicolumn{6}{c}{Surface #} |
|---|---|---|---|---|---|---|
| | 1 | 2 | 4 | 5 | 6 | 7 |
| k = | −6.73941E−01 | 0.00000E+00 | −3.19395E+00 | −1.66409E−01 | −1.01617E+01 | −5.91751E+00 |
| A4 = | 2.54618E−02 | −6.13822E−02 | −5.21502E−01 | 9.31825E−02 | −1.12751E−01 | −8.05381E−02 |
| A6 = | −3.62565E−02 | −6.82301E−02 | −1.87624E−01 | −2.02489E−01 | 4.41318E−02 | 1.49231E−02 |
| A8 = | 8.66766E−02 | −2.88409E−01 | 3.67504E+00 | 1.60997E+00 | −4.55468E−03 | −4.23526E−03 |
| A10 = | −2.53919E−01 | 3.49835E−01 | −4.60036E+00 | −1.01596E+00 | | 6.08206E−05 |
| A12 = | | | | | | 1.50384E−04 |

Figure 3:
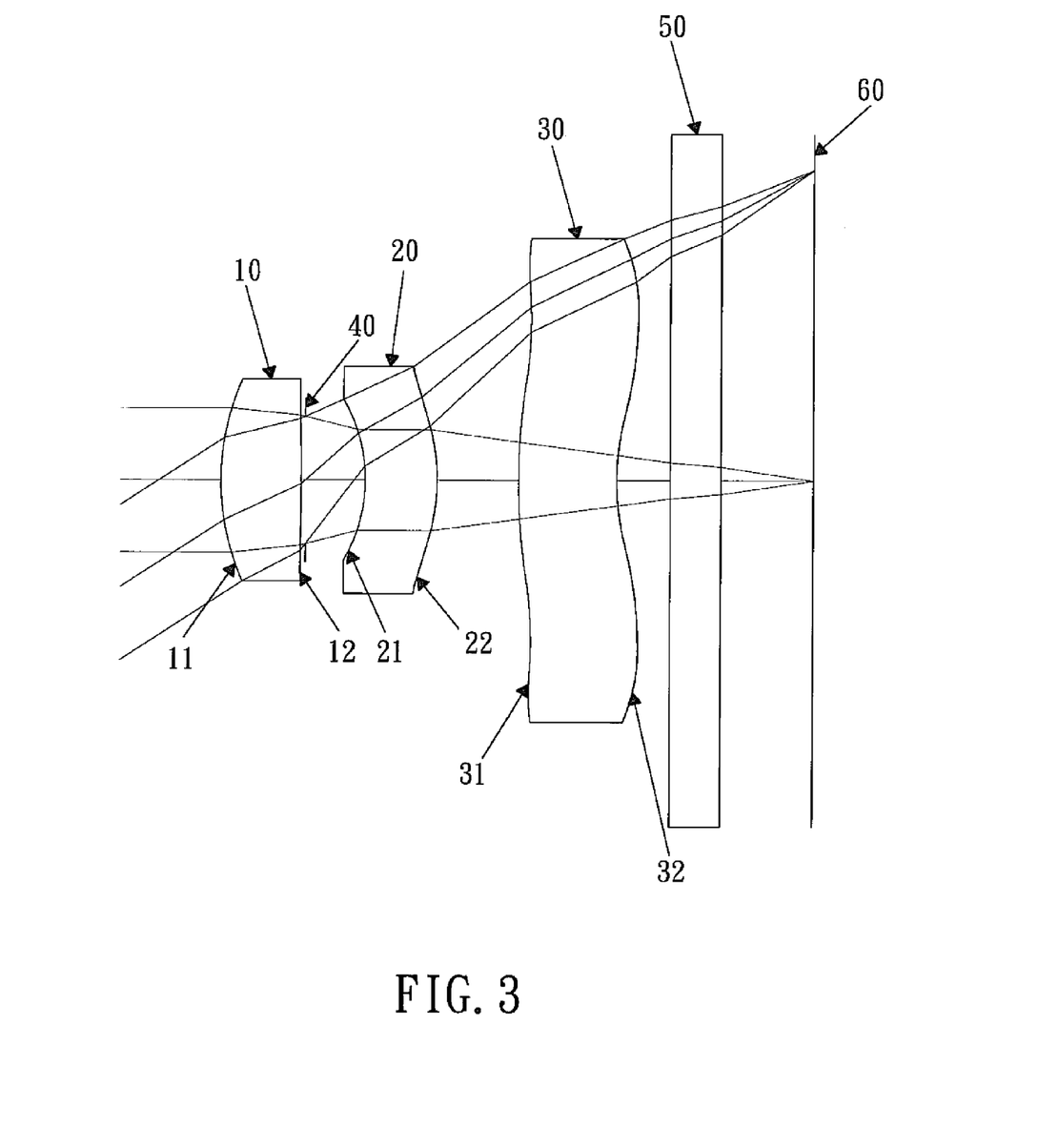
FIG. 3 shows an optical lens system for taking image in accordance with a second embodiment of the present invention.
Figure 4:
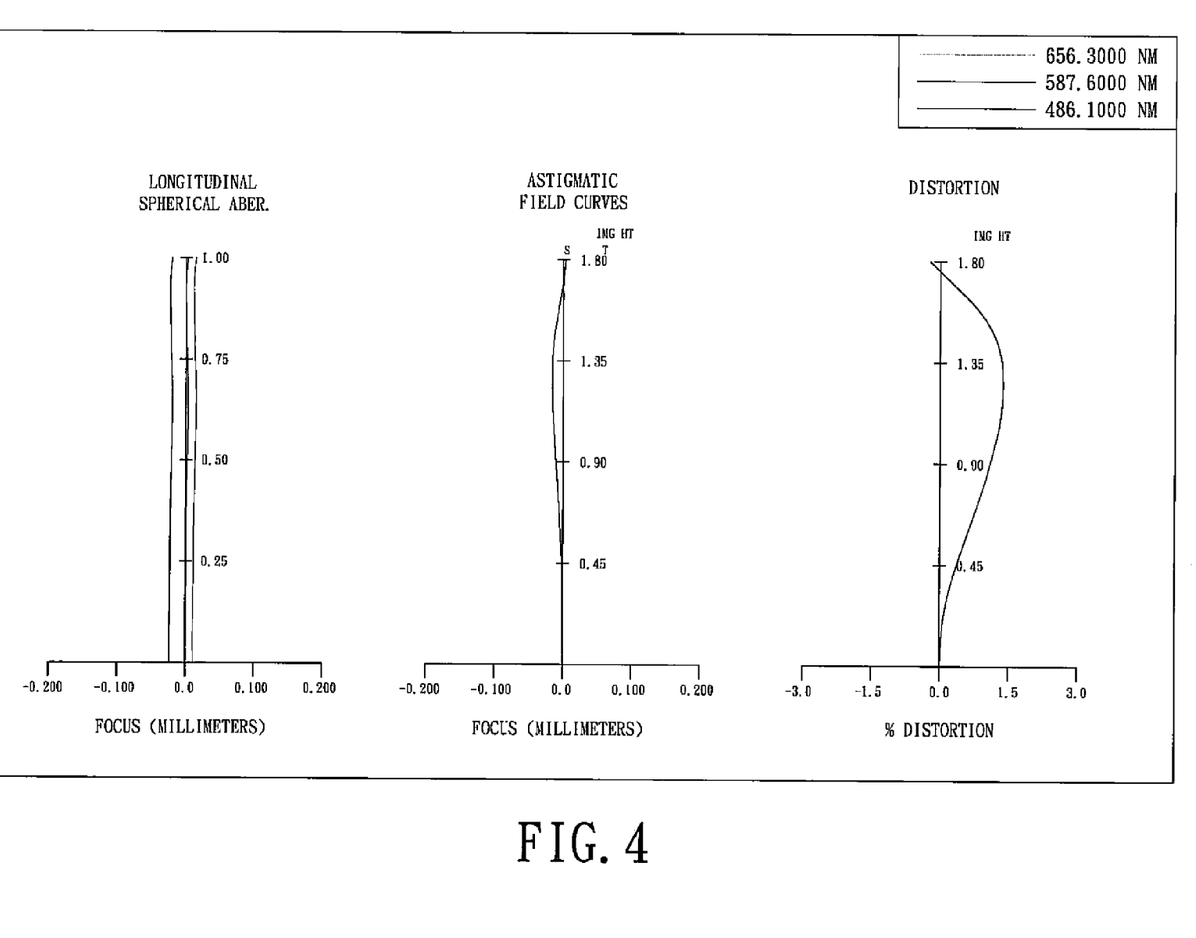
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention consists of three lens elements with refractive power: in order from the object side to the image side:

A meniscus plastic first lens element 10 with positive refractive power has a convex object-side surface 11, and the object-side surface 11 and the image-side surface 12 of the first lens element 10 are both aspheric.

A meniscus plastic second lens element 20 with negative refractive power has a convex image-side surface 22, and the object-side surface 21 and the image-side surface 22 of the second lens element 20 are both aspheric.

A meniscus plastic third lens element 30 with negative refractive power has a convex object-side surface 31, the object-side surface 31 and the image-side surface 32 of the third lens element 30 are both aspheric, and inflection points are formed on the object-side surface 31 and the image-side surface 32 of the third lens element 30.

An aperture stop 40 is located between the first lens element 10 and the second lens element 20.

An IR filter 50 is located behind the third lens element 30 and has no influence on the focal length of the system.

An image plane 60 is located behind the IR filter 50.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the second lens element is f2, the focal length of the third lens element is f3, and they satisfy the relations:

$f=2.88$ mm;

$f/f1=1.33$;

$f/f2=-0.32$;

$f/f3=-0.10$.

In the second embodiment of the present optical lens system for taking image, the refractive index of the first lens element is N1, and it satisfies the relation: $N1=1.543$.

In the second embodiment of the present optical lens system for taking image, the refractive index of the second lens element is N2 and it satisfies the relation: $N2=1.632$.

In the second embodiment of the present optical lens system for taking image, the refractive index of the third lens element is N3, and it satisfies the relation: $N3=1.543$.

In the second embodiment of the present optical lens system for taking image, the Abbe number of the first lens element is V1, the Abbe number of the second lens element is V2, the Abbe number of the third lens element is V3, and they satisfy the relations:

$V2=23.4$;

$V3=56.5$;

$V1-V3=0.0$;

$(V1+V3)/2-V2=33.1$.

In the second embodiment of the present optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and they satisfy the relations:

$1/R2=0.02$ mm$^{-1}$;

$R1/R2=0.02$;

$R3/R4=0.72$;

$R5/R6=1.25$.

In the second embodiment of the present optical lens system for taking image, the tangential angle of the image-side surface of the third lens element at the position of its effective optical diameter is ANG32, and it satisfies the relation:

$ANG32=-26.5$ deg.

In the second embodiment of the present optical lens system for taking image, the total track length of the optical lens system for taking image is TTL, the maximum image height of the optical lens system for taking image is ImgH, and they satisfy the relation:

$TTL/ImgH=1.91$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

In the present optical lens system for taking image, the first lens element can be made of glass or plastic. If the first lens element is made of glass, there is more freedom in distributing the refractive power of the optical lens system. If the first lens element is made of plastic, the cost will be effectively reduced

TABLE 3

(Embodiment 2)
f(focal length) = 2.88 mm, Fno = 3.4, HFOV (half of field of view) = 32.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.15841 (ASP) | 0.480 | Plastic | 1.543 | 56.5 | 2.17 |
| 2 | | 53.53850 (ASP) | 0.023 | | | | |
| 3 | Ape.Stop | Plano | 0.316 | | | | |
| 4 | Lens 2 | −0.85821 (ASP) | 0.412 | Plastic | 1.632 | 23.4 | −9.00 |
| 5 | | −1.19852 (ASP) | 0.475 | | | | |
| 6 | Lens 3 | 1.94174 (ASP) | 0.567 | Plastic | 1.543 | 56.5 | −28.69 |
| 7 | | 1.54916 (ASP) | 0.300 | | | | |
| 8 | IR-filter | Plano | 0.300 | Glass | 1.517 | 64.1 | |
| 9 | | Plano | 0.533 | | | | |
| 10 | Image | Plano | | | | | |

TABLE 4

Aspheric Coefficients

| | Surface # | | | | | |
|---|---|---|---|---|---|---|
| | 1 | 2 | 4 | 5 | 6 | 7 |
| k = | −8.26108E−01 | 0.00000E+00 | −2.41540E+00 | −1.32770E−01 | −1.76521E+01 | −8.68756E+00 |
| A4 = | 1.85650E−02 | −2.41358E−01 | −5.49567E−01 | −2.57232E−03 | −1.39911E−01 | −1.07475E−01 |
| A6 = | −1.64526E−01 | −1.94640E−01 | 1.66074E−01 | 3.62447E−01 | 6.06296E−02 | 2.88793E−02 |
| A8 = | 1.25011E−01 | −2.96765E+00 | 3.55408E+00 | 1.07460E+00 | −6.70740E−03 | −8.74226E−03 |
| A10 = | −1.64493E+00 | 8.75415E+00 | −9.10462E+00 | −9.08855E−01 | | −6.63669E−04 |
| A12 = | | | | | | 5.92737E−04 |

TABLE 5

|  | Embodiment 1 | Embodiment 2 |
|---|---|---|
| F | 3.11 | 2.88 |
| Fno | 3.6 | 3.4 |
| HFOV | 29.9 | 32.1 |
| V2 | 56.5 | 23.4 |
| V3 | 56.5 | 56.5 |
| V1 − V3 | 0.0 | 0.0 |
| (V1 + V3)/2 − V2 | 0.0 | 33.1 |
| N1 | 1.543 | 1.543 |
| N2 | 1.543 | 1.632 |
| N3 | 1.543 | 1.543 |
| f/f1 | 1.12 | 1.33 |
| f/f2 | −0.12 | −0.32 |
| f/f3 | −0.05 | −0.10 |
| 1/R2 | 0.13 | 0.02 |
| R1/R2 | 0.17 | 0.02 |
| R3/R4 | 0.82 | 0.72 |
| R5/R6 | 1.20 | 1.25 |
| ANG32 | −19.2 | −26.5 |
| TTL/ImgH | 2.08 | 1.91 |

It is to be noted that the tables 1-4 show different data from the different embodiments, however, the data of the different embodiments is obtained from experiments. Therefore, any product of the same structure is deemed to be within the scope of the present invention even if it uses different data. Table 5 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image consisting of three lens elements, in order from the object side to the image side:

a meniscus first lens element with positive refractive power having a convex object-side surface;

an aperture stop;

a meniscus plastic second lens element with negative refractive power having a convex image-side surface, an object-side surface and the image-side surface of the second lens element being both aspheric, an Abbe number of the second lens element being V2, and it satisfying the relation:

$V2>40;$ and a meniscus plastic third lens element with negative refractive power having a convex object-side surface, the object-side surface and an image-side surface of the third lens element being both aspheric, an Abbe number of the third lens element being V3, and it satisfying the relation:

$V3>40;$ wherein the focal length of the optical lens system for taking image is f, a focal length of the second lens element is f2, a focal length of the third lens element is f3, and they satisfy the relation:

$-0.5<f/f2<0;$ $-0.5<f/f3<0.$

2. The optical lens system for taking image as claimed in claim 1, wherein the first lens element is made of plastic material, and the object-side surface and an image-side surface of the first lens element are both aspheric.

3. The optical lens system for taking image as claimed in claim 2, wherein inflection points are formed on at least one of the object-side and the image-side surfaces of the third lens element.

4. The optical lens system for taking image as claimed in claim 3, wherein an Abbe number of the first lens element is V1, the Abbe number of the second lens element is V2, the Abbe number of the third lens element is V3, and they satisfy the relations:

$V1-V3<10;$ $(V1+V3)/2-V2<8.$

5. The optical lens system for taking image as claimed in claim 4, wherein a focal length of the optical lens system for taking image is f, a focal length of the first lens element is f1, and they satisfy the relation:

$0.9<f/f1<1.5.$

6. The optical lens system for taking image as claimed in claim 1, wherein the focal length of the optical lens system for taking image is f, the focal length of the first lens element is f1, the focal length of the second lens element is f2, the focal length of the third lens element is f3, and they satisfy the relations:

$1.1<f/f1<1.25;$ $-0.15<f/f2<-0.03.$ $-0.15<f/f3<-0.03.$

7. The optical lens system for taking image as claimed in claim 2, wherein a radius of curvature of the image-side surface of the first lens element is R2, and it satisfies the relation:

$1/R2<0.15\ mm^{-1}.$

8. The optical lens system for taking image as claimed in claim 7, wherein a radius of curvature of the object-side surface of the first lens element is R1, the radius of curvature of the image-side surface of the first lens element is R2, and they satisfy the relation:

$R1/R2<0.25.$

9. The optical lens system for taking image as claimed in claim 8, wherein the radius of curvature of the object-side surface of the first lens element is R1, the radius of curvature of the image-side surface of the first lens element is R2, and they satisfy the relation:

$R1/R2<0.19.$

10. The optical lens system for taking image as claimed in claim 1, wherein a radius of curvature of the object-side surface of the second lens element is R3, a radius of curvature of the image-side surface of the second lens element is R4, a radius of curvature of the object-side surface of the third lens element is R5, a radius of curvature of the image-side surface of the third lens element is R6, and they satisfy the relations:

$0.6<R3/R4<0.9;$ $1.1<R5/R6<1.5.$

11. The optical lens system for taking image as claimed in claim 2, wherein the first lens element, the second lens element and the third lens element are all made of the same material.

12. The optical lens system for taking image as claimed in claim 1, wherein a tangential angle of the image-side surface of the third lens element at the position of its effective optical diameter is ANG32, and it satisfies the relation:

ANG32<−17 deg.

13. The optical lens system for taking image as claimed in claim 1 further consisting of an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH<2.15$.

14. An optical lens system for taking image consisting of three lens elements, in order from the object side to the image side:
a meniscus first lens element with positive refractive power having a convex object-side surface;
an aperture stop;
a meniscus plastic second lens element with negative refractive power having a convex image-side surface, an object-side surface and the image-side surface of the second lens element being both aspheric; and
a meniscus plastic third lens element with negative refractive power having a convex object-side surface, the object-side surface and an image-side surface of the third lens element being both aspheric, inflection points being formed on at least one of the object-side and the image-side surfaces of the third lens element;
a focal length of the optical lens system for taking image being f, a focal length of the first lens element being f1, and they satisfying the relation:

$1.05<f/f1<1.35$ wherein an Abbe number of the second lens element is V2, and it satisfies the relation:

V2<28.

15. The optical lens system for taking image as claimed in claim 14, wherein a radius of curvature of an image-side surface of the first lens element is R2, and it satisfies the relation:

$1/R2<0.11$ mm$^{-1}$.

16. The optical lens system for taking image as claimed in claim 15, wherein the first lens element is made of plastic material, and the object-side surface and the image-side surface of the first lens element are both aspheric, a radius of curvature of the object-side surface of the first lens element is R1, the radius of curvature of the image-side surface of the first lens element is R2, an Abbe number of the third lens element is V3, and they satisfy the relations:

$R1/R2<0.19$;

V3>40.

17. The optical lens system for taking image as claimed in claim 2, wherein a refractive index of the first lens element is N1, a refractive index of the second lens element is N2, a refractive index of the third lens element is N3, and they satisfy the relations:

1.50<N1<1.60;

1.50<N2<1.56;

1.50<N3<1.56.

* * * * *